May 16, 1967            L. JULIE            3,320,526
LOW IMPEDANCE MEASURING APPARATUS INCLUDING A PAIR OF
MULTIPLE TERMINAL NETWORKS AND A VOLTAGE DIVIDER
Original Filed Aug. 2, 1963            2 Sheets-Sheet 1

INVENTOR.
LOEBE JULIE
BY
ATTORNEY

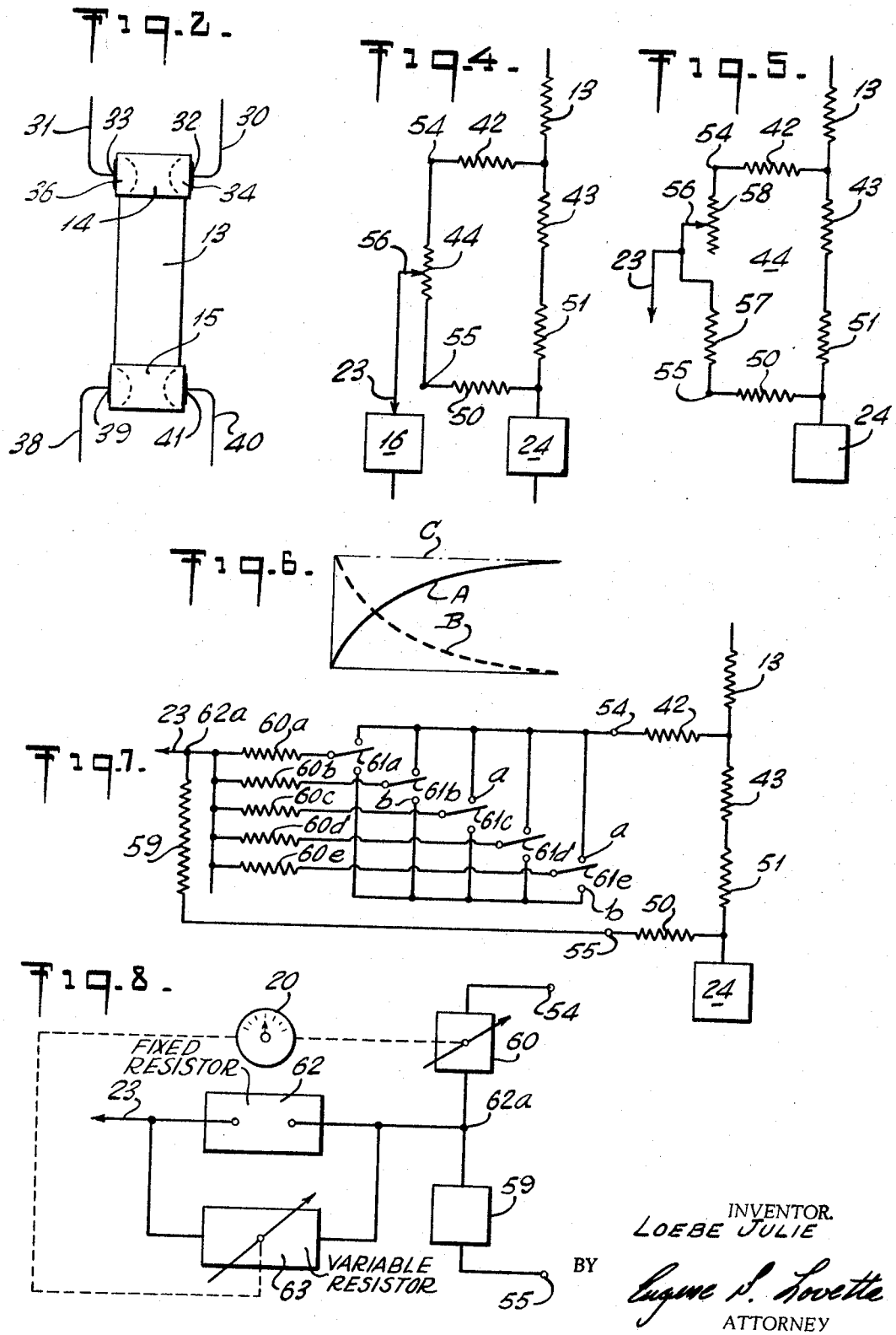

United States Patent Office 3,320,526
Patented May 16, 1967

3,320,526
LOW IMPEDANCE MEASURING APPARATUS INCLUDING A PAIR OF MULTIPLE TERMINAL NETWORKS AND A VOLTAGE DIVIDER
Loebe Julie, New York, N.Y., assignor to Julie Research Laboratories, Inc., New York, N.Y., a corporation of New York
Continuation of application Ser. No. 299,587, Aug. 2, 1963. This application June 6, 1966, Ser. No. 562,045
11 Claims. (Cl. 324—57)

The instant invention relates to an improved electrical bridge circuit for measuring impedances to a high degree of accuracy.

This application is a continuation of my co-pending application for United States patent Serial No. 299,587, filed Aug. 2, 1963, entitled, "Accurate Impedance Measuring Apparatus," and now abandoned; moreover, the invention claimed herein is an improvement and extension of the invention set forth in my United States Patent No. 3,179,880, issued Apr. 20, 1965, and entitled, "Impedance Measuring Apparatus." In said patent, it is seen that the basic measuring bridge includes two arms composed of accurate resistors and a third arm consisting of a three terminal voltage divider characterized by a selected and fixed value input impedance and, further, characterized by a linear transfer ratio. The fourth arm of the bridge is the unknown impedance under measurement. The bridge also has cross arms including a null detector and a voltage supply. In accordance with the co-pending application, a dial is ganged to the voltage divider, whereby the transfer ratio of the divider may be regulated. Furthermore, said dial is calibrated to read a linear indication in ohms so that the setting of the dial reads directly the resistance of the device under test. By placing shunt resistors across either one of the two bridge arms or across the voltage divider, the range of usefulness of the bridge may be extended to enable one to measure a wide range of unknown impedances.

It is the principal object of the invention described and claimed herein to provide an impedance measuring bridge extending the accuracy and the range of impedance measured by the bridge.

It is a further object of the invention to provide a bridge with a multiple terminal connection at the contact sockets of the impedance under measurement so as to increase the accuracy of bridge measurement.

It is a further object of the invention to modify the linear transfer ratio divider so as to permit accurate readings of the impedance under measurement in parts per million ratio or in comparison to a standard impedance.

It is a further object of the invention to include a second multiple terminal network in combination with an added divider in the bridge circuit, whereby the basic apparatus can be extended to measure ultra low values of impedance to degrees of accuracy heretofore not achieved.

Further objects and advantages will become apparent from the following description of the invention taken in conjunction with the figures, in which:

FIG. 1 illustrates schematically the basic bridge apparatus for measuring impedances including a one part per million deviation dial and a four terminal resistor connection in accordance with the principles of the invention;

FIG. 2 illustrates schematically the four terminal connection;

FIG. 3 illustrates schematically the embodiment of the bridge of FIG. 1 with the addition of a second four terminal connection and a second divider to render the bridge capable of measuring ultra low impedances;

FIG. 4 is a schematic of a portion of the bridge circuit of the embodiment of FIG. 3;

FIG. 5 is a schematic variation of FIG. 4;

FIG. 6 illustrates curves employed for explanation of the invention;

FIG. 7 illustrates schematically a conductance potentiometer for use in the foregoing contemplated bridge and FIG. 8 is a simplified schematic of the circuit shown in FIG. 7 together with an additional compensating network.

The electrical bridge 10 as contemplated herein, see FIG. 1, includes first and second resistor arms 11 and 12. The third arm of bridge 10 is the unknown impedance to be measured and is depicted as resistor 13. The ends of resistor 13 are held by socket contacts 14, 15. The fourth arm of bridge 10 is the input impedance of a voltage divider 16. In accordance with the principles of the invention, voltage divider 16 has a fixed value input impedance. A null detector 17 is connected between a common junction 18 and adjustable tap arm 19 at the output of divider 16. A dial 20 is ganged to arm 19, whereby the position of arm 19 may be adjusted by dial rotation. As indicated in the co-pending application, the scale of dial 20 is calibrated to read ohms.

An A.C. or D.C. voltage supply 21 is connected between junction 22 at the base of voltage divider 16 and on the other side to socket terminal 14. The input impedance of divider 16 may be deemed to be the resistance from a second adjustable tap arm 23 to junction 22. A shunt resistor 24 is in parallel with the voltage divider input in order to extend the range of bridge 10. Resistor 24 includes a trimmer resistor 24a. The latter may be varied to balance bridge 10 in order to indicate a null on meter 17.

As indicated in the co-pending application, voltage divider 16 is constituted by a combination of variable resistors equipped to provide a fixed value $Z_{in}$. In FIG. 1, divider is made up of a set of resistors 25, 26 and 27 to provide a total and constant bridge arm input impedance, for example, 100,000 ohms. Thus, resistor 25 is made up of a component 25a having a value of 49,925 ohms and a trimmer resistor 25b in series therewith. Trimmer 25b is equipped to provide a maximum of 50 ohms, whereby the total resistance of resistor 25 may have a value up to 49,975 ohms. The parallel combination of resistors 26, 27 are in series with R25. Resistors 26, 27 each include individual resistor elements 26a, 27a in series with respective trimmer resistors 26b, 27b. Trimmers 26b, 27b serve to regulate the parallel combination so that each resistor 26, 27 may be set at 100,000 ohms to provide a resultant value of 50,000 ohms in series with R25. A 100 ohm variable resistor 28 is in series between resistors 26, 27. The center tap arm 23 of resistor 28 connects to socket contact 15.

In brief, bridge 10 is calibrated for measurement of an unknown impedance as follows: terminals 14, 15 are shorted together, i.e. $R13=0$. Dial 20 is adjusted to indicate a null at meter 17. This calibrates dial 20 and is ganged arm 19 for zero resistance. A standard of known resistance of R ohms is then inserted between socket terminals 14, 15 and dial 20 is set for R ohms. If a null is not indicated at meter 17, trimmer 24a is adjusted until the bridge balances. The scale of dial 20 is now calibrated to read directly in ohms, hence individual unknown resistances R13 now may be inserted into the bridge for measurement. Reference may be made to the co-pending application for a development of the theory and operation of such bridge.

A second rotatable dial 29 is ganged to regulate the position of tap arm 23. Dial 29 is sometimes hereinafter referred to as the deviation dial. Its scale may be calibrated to indicate a percentage deviation or parts per million (p.p.m.) deviation of one resistor compared to another resistor. The effect of 100 ohm resistor 28 on the parallel combination of the two 100K resistors 26, 27 is less than 1 p.p.m. and as such, does not change the total input resistance of voltage divider 16. For example, when arm 23 is at the center point of 100 ohm resistor 28, the parallel combination of the two shunt arms 26, 27 is 100,050 ohms in parallel with 100,050 ohms to provide a resultant of 50,025 ohms. On the other hand, when arm 23 is at either end of resistor 28, the combination of the two shunt arms is 100,000 ohms in parallel with 100,100 ohms to provide a resultant of 50,024.9875 ohms. The deviation of total input resistance of voltage divider 16 for these two extreme positions, 0.0125/100,000, is less than 1 p.p.m. Assume that the scale for dial 29 is marked off by 100 scale indications so that each indication represents a one ohm setting for arm 23 along resistor 28. Assume for example, a standard resistor of R ohms inserted between contacts 14, 15 and bridge 10 is balanced with arm 23 at its mid-point. An unknown resistor may then be inserted between contacts 14, 15 whereby said unknown resistance may be determined by a percentage deviation from the known standard. The foregoing scale established that dial 29 reads 1/100,000 for each scale marker or deviation up to 1,000 p.pm. For example, if the unknown has the same resistance as the standard, no adjustment need be made to dial 29 because meter 17 reads a null with arm 23 at the midpoint of resistor 28. If the unknown is nominally equal to the standard but slightly off, dial 29 will have to be adjusted to return bridge 10 to balance. Reading of dial 29 at balance will now indicate the unknown with respect to the standard. For example, if dial 29 has to be moved five scale indications, its resistance differs from the standard by 0.00005×R ohms. Hence, the foregoing permits an exact reading of an unknown by a comparison technique up to 100/100,000 or 1,000 p.p.m. deviation with respect to a standard resistor.

As seen, the foregoing permits one to make an accurate measurement of an unknown resistor with respect to a standard. Should the unknown be a decade box or other type of variable resistor, one may use the foregoing to calibrate the variable so that it is adjusted to have a resistance exactly equal to the standard. Assume that dial 29 has been set and bridge 10 balanced by a prior measurement of a standard. The unknown variable is measured and adjusted resistance-wise while in the bridge until bridge 10 balances with dial 29 at the position previously set to balance the bridge with the standard between terminals 14, 15. The foregoing arrangement of the bridge thus provides one the means of reading the value of the unknown resistance directly in ohms by use of dial 20 or determining its deviation by reading directly from dial 29.

More accurate measurement of resistance may be made by eliminating the spurious effects of connection resistance at socket contacts 14, 15 and the resistances of lead or connection wires normally employed to connect the socket connections 14, 15 to the adjacent elements of the bridge. The four terminal design of the instant invention makes possible the elimination of such spurious resistances and is depicted schematically in FIG. 2 and its electrical equivalent is shown in FIG. 1. In FIG. 2, the resistance 13 under test is held at its respective ends by the individual contact sockets 14, 15. Contact sockets 14, 15 are made of highly conductive, low resistivity material and are designed in accordance with the art to provide a minimum contact resistance. Instead of one lead from contact socket 14 to a common junction made up of the upper end of resistor 11 and one side of battery 21, two lead wires 30, 31 are employed. Lead wire 30 connects one side of battery 21 to contact socket 14 at connection point 32, see FIG. 2. Lead wire 31 connects the upper side of resistor 11 to the same contact socket 14 at connection point 33. By the foregoing arrangement, the resistance of that portion (designated as 34) of contact socket 14 adjacent actual connection point 32 plus the resistance of said actual point of connection 32 plus the resistance of lead 30 (these resistances are in series and are depicted by resultant series resistance 35 in FIG. 1) may now be deemed to be electrically part of the battery resistance instead of electrically part of the resistance of resistor 13 under test.

Similarly, the resistance of portion 36 adjacent the actual point of contact 33 plus the resistance of said actual point of contact 33 plus the resistance of lead 31 (depicted as resultant series resistance 37 in FIG. 1) may now be deemed to be part of the resistance of resistor 11 in contrast to being electrically part of resistor 13 being measured. The same technique is employed at the other end of resistor 13, wherein lead wire 38 connects arm 23 to contact socket 15 at connection point 39 and lead wire 40 connects shunt resistor 24 to contact socket 15 at connection point 41. The latter two connections are represented by respective resultant resistances 42, 43 in FIG. 1, wherein resultant resistance 42 is now electrically part of the input to voltage divider 16 and resultant resistance 43 is electrically part of resistor 24 and thus both R42 and R43 are electrically eliminated from being part of resistance 13 being measured.

As noted before, contact resistance 35 is part of the battery. The effect of this slight resistance is to reduce battery current by a very small amount, however, this arrangement does not affect bridge balance. Resultant resistance 37, now part of bridge arm resistor 11, does not affect the value of the bridge arm resistor 11 because from known calculations the value of R37 is in the order of 0.01 ohm, wherein R11 is in the order of 25K ohms. It will be observed that spurious resistances such as R35, R37, R42 and R43 will be deemed herein to have values in the order of 0.01 ohm. Such value of resistance is consonant with the practice in the art. Consequently, the order of bridge balance change 0.01/25,000 is 1 part in 2,500,000 which is negligible with respect to bridge operation. Equivalent resistance 42 is actually in series with voltage divider 16 and its effect on bridge balance is approximately 0.01 ohm/100,000 ohms which is less than 1 part in 10,000,000 and thus it is insignificant and negligible in effect.

As noted before, resultant resistance 43 is now part of resistor 24. This will cause a change in bridge balance in the order of 0.01 ohm/R24. The effect of such unbalance is negligible when R24 is large. However, for relatively small values of R24, such as 1,000 ohms, the effect of unbalance may become appreciable. However, it will be noted that trimmer resistance 24a is provided with a sufficiently large range to cancel out the effect of the contact and lead resistance represented by R43. Thus, it is seen from FIG. 1 that a more accurate measurement of unknown resistance becomes feasible upon use of the four terminal design depicted in FIG. 2, because this arrangement effectively electrically isolates the resistance in test R13 from the spurious resistances R35, R37, R42 and R43.

Upon using the circuit of FIG. 1, the only appreciable net change on bridge accuracy will be the change of resistance R43 when one employs such bridge for measuring an unknown with respect to a standard or another resistor. For example, when a standard is inserted between contacts 14, 15 to calibrate initially bridge 10, trimmer 24a is adjusted with the standard between terminals 14, 15 to achieve the bridge balance and meter null. Upon removal of said standard and upon replacing same with the unknown to be measured and compared to the standard, it will be understood that trimmer 24a should not then be changed from its first setting. Consequently, the degree of bridge unbalance or inaccuracy because of some change of equivalent resistor R43 may be expressed as follows:

$$\frac{R43 \text{ (standard)} - R43 \text{ } (X)}{\text{Total } R24} \quad (1)$$

where R43 (standard) is the value of R43 when the standard is in the bridge; and where R43 (X) is the value of R43 when the unknown is in the bridge. The value of the numerator of Equation 1 has been calculated to be approximately 0.001 ohm. For values of R24 greater than 1,000 ohms, the unbalance indicated by Equation 1 is less than 1 p.p.m. which is negligible and thus does not violate the high degree of precision achieved by the disclosed bridge. However, for values of R24 less than 1,000 ohms, i.e. 100 ohms, 10 ohms, 1 ohm, etc., the change in R43 (represented by the numerator of Equation 1) becomes significant in view of the extreme accuracies contemplated herein.

As noted before, the value of R24 is selected to be low in value for ultra low ranges of resistor measurements. Hence, for such low ranges of shunt resistor 24, a four terminal connection is employed at the ends of resistor 24 and a second voltage divider 44 is introduced into the bridge circuit as depicted schematically in FIG. 3.

In FIG. 3, the elements of bridge 10 corresponding to identical elements of bridge 10 depicted in FIG. 1 are designated by the same reference numbers used in FIG. 1. Resistor 13 is under test and it is connected across sockets 14, 15 in accordance with the four terminal connection as noted hereinbefore. In this instance, a four terminal connection similar to that shown in FIG. 2 is employed to connect to the ends of resistor 24. The four terminal connection for resistor 24 includes socket contacts 45, 46 and lead wires 40, 47, 48 and 49. These contact and lead resistances are represented schematically by resistors 50, 51, 52 and 53 developed in the same manner as described hereinbefore, except that the resistance of lead 40 is now split between R43 and R51.

Resistance 53 is now electrically part of the battery circuit and reduces the battery current a very slight amount, but does not affect balance of bridge 10. Resistance 52 is split between trimmer resistor 25a, i.e. added in series to divider 16, and resistance arm 12. The portion of resistance 52 added to voltage divider 16 is readily cancelled out by trimmer resistor 25a. The portion of resistance 52 added to resistance arm 12 creates a bridge unbalance change less than 1 p.p.m., the error ratio is 0.005/25K, and thus does not affect the balance of the system. Resistance 51 is connected by line 40 to resistance 43. Resistance 50 is connected in series to one side of the input to voltage divider 44 as depicted in detail in FIG. 4. The input of voltage divider 44 may be deemed to be from point 54 to point 55, see FIG. 4. The output from voltage divider 44 is taken from its adjustable tap arm 56 and fed to tap arm 23 and thus is the input to voltage divider 16. From FIG. 4, it is also seen that R42 is in series with the input to divider 44.

The purpose and requirements of voltage divider 44 become evident from FIG. 4. Resistance 51 from the contact 45 is essentially in series with resistance 43 from contact 15. Resistor 50 from contact 45 is essentially in series with one side of the input to divider 44, whereas resistor 42 from contact 15 is essentially in series with the other side of the input to divider 44, and as noted hereinbefore, the output of divider 44 at arm 56 forms the input to divider 16 which is one of the bridge arms. Voltage divider 44 serves to split series resistors 43, 51 into a ratio equal to the ratio of the value of resistor R13 to the value of the parallel combination of resistor R24 and the input of divider 16. The significance of this statement is seen from the fact that the value of resistance under test R13 is directly proportional to the input impedance of divider 16. Thus, if divider 44 splits the ratio of R43 to R51 in the same manner as the ratio of R13 is to the impedance input of bridge arm 16, then the effect of R43 and R51 on bridge balance is cancelled. As a second requirement, the input impedance of divider 44 must be much greater than the series combination of resistors R42, R50, whereby R42+R50 has no effect upon the input to divider 44. Since the output of divider 44 is in series with the input of divider 16, the former could effect the balance of the bridge system. Consequently, as a third requirement, the output resistance of divider 44 should be either (a) small compared to the input resistance of divider 16 so as to have a negligible effect upon bridge balance; or (b) if not small, then a constant value to permit a constant to be added to the input resistance of divider 16; or (c) calculable in its effect upon the input resistance of divider 16 so that the load of $Z_{out}$ of divider 44 on $Z_{in}$ of divider 16 may be compensated for or cancelled out during bridge operation. For example, assume that the input impedance of divider 44, R44, equals 1,000 ohms. Assume that $$R42 = R43 = R50 = R51 = 0.01 \text{ ohm}$$

Assume further that $R13 = 1$ ohm. R24 is set so that R24 in parallel with $R16 = 1$ ohm. For this measurement, divider arm 56 is set at its mid-position along divider 44, whereby R43 and R51 are divided into a 1 to 1 ratio between R13 and the parallel combination of R24 and R16. The parallel combination of R24 and R16 is effectively the impedance of the fourth arm of the bridge.

If $R13 = 0$, then voltage divider arm 56 should be set at its top position along R44. At this zero setting, the ratio from FIG. 4 is:

$$\frac{R42}{R44 + R42 + R50} \times (R43 + R51) \doteq \frac{0.01}{1000.02} \times .02 = \frac{1}{5}\mu\text{ohm} \quad (2)$$

Equation 2 shows that for the extreme position of zero setting, ⅕ μohm is added to R13 which is well within 1 p.p.m. and hence negligible. The zero setting also provides the ratio:

$$\frac{R44 + R50}{R44 + R42 + R50} \times (R43 + R51) = \frac{1000.01}{1000.02} \times 0.02 \doteq .02 \text{ ohm}$$

added in series to the parallel combination of R16 and R44.

The foregoing examples indicate that voltage divider 44 should have a voltage characteristic in the form of:

$$\frac{e_{out}}{e_{in}} = \frac{x}{x+s}$$

where X equals the resistance value of the unknown, and S equals the resistance value of the parallel combination of resistance 24 and $Z_{in}$ for divider 16. In the first instance, when $R13 = S = 1$ ohm, arm 56 was set at mid-position along R44, whereby ½ the output from divider 44 is added to the input to divider 16. In the extreme position, when $R13 = 0$, arm 56 was set at the upper end of R44, hence substantially a zero voltage is added to the input of divider 16 by divider 44.

FIG. 5 illustrates one embodiment of a voltage divider 44 capable of providing a desired characteristic $X/(X+S)$. In FIG. 5, divider 44 includes a fixed resistor 57 in series with a linear slide wire potentiometer 58. Potentiometer 58 has an adjustable tap arm 56 for providing an output fed in series to voltage divider 16. It will be understood that the combination of fixed resistor 57 and slide wire potentiometer 58 has the characteristic of the form $e_{out}/e_{in} = X/(X+S)$.

On the input side, voltage divider 44 will produce a ratio of resistor division between R43 and R51 in the ratio of X/S. Neglecting R42 and R50 in comparison to the larger value for fixed resistor 57, the setting of slide wire potentiometer 58 for determining the R43 to R51 ratio can be determined from the following:

$$\frac{\frac{R58}{R58+R57} \times (R43+R51)}{\frac{R57}{R58+R57} \times (R43+R51)} = \frac{X}{s} \quad (3)$$

$$\frac{R58}{R57} = \frac{X}{s} \quad (4)$$

Thus, knowing the value of R57 and the value of the parallel combination of shunt resistor R24 and the $Z_{in}$ of voltage divider 16, the setting of slide wire arm 56 along potentiometer 58 will depend directly upon the value of the unknown resistor X.

The output impedance of divider 44 constituted by slide wire potentiometer 58 in series with fixed resistor 57 is depicted by the asymptotic curve A of FIG. 6. Since the output resistance of divider 44 varies as indicated by curve A, a suitable compensation network is added to bridge 10 in order to keep the bridge in balance as settings along the slide wire potentiometer 58 are changed from one position to the other, depending upon the value of R13. Such compensating network may be placed in series with either resistor arm 11 or 12. In addition, the compensating network may be ganged to slide wire arm 56 so that compensation is automatic and simultaneous with change of position of arm 56 along potentiometer 58. As another solution, a compensating resistance may be placed in series with the output voltage divider 44. In this instance, the compensating resistance is designed to add a resistance function, curve B of FIG. 6, which complements the resistance function, curve A of FIG. 6, of voltage divider 44. The addition of the two resistance functions will produce effective constant output resistance, curve C of FIG. 6.

FIG. 7 illustrates a linear conductance potentiometer 44a which may be used in lieu of divider 44. The input to potentiometer 44a is connected in series with resistors 42, 50, and then bridged by resistors 43, 51 similar to that shown in FIGS. 4 and 5. Conductance potentiometer 44a is made up of a fixed conductance 59 and a plurality of parallel conductances 60a through 60e. Each conductance 60 is connected to the top end of conductance 59. The other side of each conductance 60 is in series with an individual switch 61a . . . e, wherein when the individual switch 61 is placed in its upper "a" position, the correlated conductance is inserted in series from junction 62 to junction 54. When the individual switches 61a . . . e are in the lower positions "b," the correlated conductance elements are out of the circuit. From the figure, the input to conductance potentiometer 44a is between junctions 54, 55. The output of conductance potentiometer 44a is taken from junction 62a and fed to tap arm 23 of voltage divider 16.

FIG. 8 illustrates schematically the electrical equivalent of conductance 44a depicted in FIG. 7. Letting G59 represent the fixed conductance 59 and equal to 1/R59 and G60 equal the individual variable conductances and equal to 1/R60, the ratio $$\frac{e_{out}}{e_{in}} = \frac{R59}{R59+R60} = \frac{1}{1+\frac{R60}{R59}} \quad (5)$$

$$= \frac{1}{1+\frac{G59}{G60}} = \frac{G60}{G60+G59} \quad (6)$$

From Equation 6 it is seen that the ratio of conductance potentiometer 44a has the desired form of $X/(X+S)$, where the variable conductance G60 is directly proportional to the unknown X or R13. The switches 61a . . . e may be in a form of a dial and that dial may be ganged as depicted in FIG. 8 to operate simultaneously with dial 20 of voltage divider 16. Hence, as the value of the unknown is read on voltage divider 16, a suitable one of the particular conductances 60 is inserted into conductance potentiometer 44a circuit so as to divide up resistances 43, 51 in proper ratio between unknown R13 and the parallel combination of divider 16 and potentiometer 24 to insure an accurate bridge measurement.

In order to keep the output impedance of conductance potentiometer 44a a constant so that it will not affect bridge balance, a compensating network should be added in series with the conductance potentiometer. Since potentiometer output is characterized by $X/(X+S)$, a change in its output impedance for various selections of R13 requires compensation to off-set said change in the same manner as indicated hereinbefore with respect to network 44. The compensating network is shown in FIG. 8 in series with the output of conductance potentiometer 44a so that the resultant impedance load on divider 16 is a constant for for each selection of conductance 60a . . . e. The compensating network consists of a fixed resistor 62 shunted by a variable resistor 63 as indicated in FIG. 8.

The output resistance of conductance potentiometer 44a is: $R59 \times R60/R59+R60$. Let the compensating circuit fixed resistor 62 have a value A and the variable resistor 63 in parallel therewith have a value equal $B/R60$, the impedance of the compensating network is:

$$\frac{A \cdot B/R60}{A+B/R60} = \frac{A \cdot B}{R60 \times A+B} = \frac{B}{R60+\frac{B}{A}}$$

For the purpose of compensation, the sum of the total impedance of $Z_{out}$ of conductance 44a plus the compensating network must be a fixed value constant such as K. Hence, $$\frac{R60 \times R59}{R60+R59} + \frac{B}{R60+\frac{B}{A}} = K$$

let $$\frac{B}{A} = R59$$

then $$\frac{R60 \cdot R59}{R60+R59} + \frac{B}{R60+R59} = \frac{(R60 \times R59)+B}{R60+R59} = K$$

let $B=(R59)^2$, then $$\frac{R59(R59+R60)}{(R59+R60)} = K \quad (7)$$

Hence, $R59=K$; since $B/A=R59=K$ and $B=(R59)^2$, then $A=R59$, hence the compensating network consists of the fixed value resistance equal to R59 in parallel with the variable resistance $(R59)^2/R60=K^2/R60$. The variable 63 may be a set of resistors ganted to the switch 61 so that upon the selection of R60a . . . e in conductance potentiometer 44a, the same action also effects the selection of the same value of R60 at resistor 63.

It is intended that all matter contained in the above description or shown in the accompanying drawings shall be interpreted as illustrative and not in a limiting sense.

What is claimed is:

1. In an impedance bridge for measuring impedances and having electrically interconnected bridge arms forming a closed loop, the combination including said bridge arms for effectively isolating the impedance element under measurement from spurious lead and terminal connection impedances comprising, first means in a first of said bridge arms for electrical connection to the impedance element under test, first and second voltage divider means for providing respective input and output voltage connections in a second of said bridge arms, an output connection of said first voltage divider means being adjustable for providing a variable voltage, second means for connecting said last-mentioned output to one input side of said second voltage divider means, means in said second bridge arm for extending the range of impedance bridge measurements, and multiple wire connection means coactive with a portion of said first means for electrically forming a bridge junction and for connecting adjacent ends of said first and second bridge arms, said multiple wire means including respective connections as follows:

(a) a connection from one side of said element to one side of said range extending means, (b) a connection from said one side of said element to one input side of said first voltage divider means, and (c) a connection from said one side of said range extending means to a second input side of said first voltage divider means.

2. Means as defined in claim 1, said first voltage divider means having a fixed value impedance and a variable impedance connected to one side of said last-mentioned fixed value impedance, said second connection means electrically coupling said last-mentioned variable impedance to said one input side of said second voltage divider means, and the aforesaid (c) multiple wire bridge junction connection from said range extending means to said first voltage divider means being a connection to another side of said fixed value impedance.

3. Means as defined in claim 2, further including means connected in series between said one input side of said second voltage divider means and the junction common to said variable and fixed value impedances of said first voltage divider means for providing an effective constant impedance input to said one input side of said second voltage divider means to compensate for different settings of said first voltage divider means variable impedance comprising, compensator impedance means having a fixed value equal to the value of said first voltage divider means fixed value impedance and in shunt with variable compensator impedance means, said last-mentioned means having an impedance value inversely proportional to the impedance value of said first voltage divider means variable.

4. Means as defined in claim 1 wherein, said first voltage divider means having a fixed value impedance and a variable impedance connected to one side of said last-mentioned fixed value impedance, the aforesaid (c) multiple wire bridge junction connection from said range extending means to said first voltage divider means being a connection to another side of said fixed value impedance, and compensation impedance means connected in series between said one input side of said second voltage divider means and the junction common to said variable and fixed value impedances of said first voltage divider means for providing an effective constant impedance input to said one input side of said second voltage divider means to compensate for different impedance values of said first voltage divider means variable impedance, said compensation means having an impedance characteristic inversely proportional to the impedance characteristic of said first voltage divider means.

5. In an impedance measuring means having electrically interconnected arms forming a closed looped measuring bridge and having power source means and null indicator means for balancing said bridge in respective bridge cross-arms, the combination including said interconnected bridge arms comprising, first means in a first of said bridge arms for connection with an impedance under measurement, first voltage divider means of known transfer ratio and having a fixed impedance input in a second of said bridge arms and also having a variable impedance output connected to one of said bridge cross-arms, said voltage divider means including first, second and third impedance means, one side of each of said first, second and third impedance means forming a common junction, second means for connecting another side of said first impedance means to a bridge corner junction, second impedance divider means of relatively small impedance value compared to the values of said first, second and third impedance means, said second voltage divider means being connected between other sides of said second and third impedance means, said second divider means having variable impedance tap-off means, a second bridge corner junction for interconnecting said first and second bridge arms and including third means for connecting one side of said impedance under measurement to said second divider tap-off, and means for controlling said second divider tap-off for representing deviation of full scale impedance when said bridge is in balanced status.

6. Means in accordance with claim 5 further including: means for extending the range of the impedance measuring means; an impedance network having input and output terminals in said second bridge arm; and said third connecting means including, a connection from said one side of said element to one side of said range extending means, a connection from said network output terminal to said second divider tap-off, a connection from said one side of said element to one of said network input terminals, and a connection from said one side of said range extending means to another network input terminal.

7. Means in accordance with claim 6 further including, a compensating network connected between said impedance network output terminal and said second divider tap-off and having an impedance characteristic inversely proportional to the impedance characteristic of said impedance network for providing a constant input impedance to said second divider tap-off.

8. In an impedance measuring bridge having electrically interconnected bridge arms forming a closed loop measuring bridge and having power source means and null indicator means for balancing said bridge in respective bridge cross-arms, the combination including said interconnecting bridge arms for effectively isolating the impedance element under measurement from spurious lead and terminal connection impedances comprising, first means in a first of said bridge arms for electrical connection to the impedance element under test; means in a second bridge arm for extending the range of impedance bridge measurements; a voltage divider having a linear transfer ratio and having a fixed value input impedance in said second bridge arm, said voltage divider having first, second and third impedance means, one end of each of said first, second and third impedance means being connected to a common junction, a second end of said first impedance means and a first end of said range extending means being connected to a bridge junction, said second impedance means having a variable output tap connected to a bridge cross-arm, a variable tap-off impedance of relatively small impedance value compared to said first, second and third impedance means connected between second ends of said second and third impedance means; multiple connection means for electrically forming a bridge corner junction and for connecting one end of said impedance element to a second end of said range extending means and also to said tap-off of said variable small impedance; and means for controlling said variable small impedance tap-off for indicating the deviation of full scale impedance when said bridge is in balanced status.

9. In an impedance bridge in accordance with claim 8 further including an impedance network having respective input and output terminals, an output terminal of said network being connected to said variable small impedance tap-off, and the said bridge corner junction connection means now including, a connection from said impedance element one end to one of said network input terminals, a second connection from said impedance element one end to said range extending means second end, and a third connection from said range extending means second end to another of said network input terminals.

10. In an impedance bridge in accordance with claim 9 wherein, said impedance network including serially connected fixed and variable impedances connected between said input terminals thereof, said output terminal thereof being connected to the junction of said last-mentioned fixed and variable impedances.

11. In an impedance bridge in accordance with claim 10 further including, a compensating network connected between said impedance network output terminal and said variable small impedance value tap-off and having an impedance characteristic inversely proportional to the impedance characteristic of said impedance network for providing a constant input impedance to said variable small impedance value tap-off terminal, said compensating network including a parallel connection of a fixed impedance equal in magnitude to the value of the impedance network fixed impedance, and a variable impedance whose magnitude is inversely proportional to the magnitude of the impedance network variable impedance.

References Cited by the Examiner

UNITED STATES PATENTS 3,179,880  4/1965  Julie _____ 324—57

OTHER REFERENCES

Warshawsky, "Multiple-Bridge Circuits for Measurement of Small Changes in Resistance," The Review of Scientific Instruments, vol. 26, No. 7, July 1955, pp. 711–715.

WALTER L. CARLSON, *Primary Examiner.*

E. E. KUBASIEWICZ, *Assistant Examiner.*